United States Patent [19]
Kean

[11] 3,812,776
[45] May 28, 1974

[54] CAGE-TYPE ROTARY SPIT
[76] Inventor: George W. Kean, Woodland Dr., Granby, Conn. 06035
[22] Filed: July 21, 1972
[21] Appl. No.: 274,099

[52] U.S. Cl..................... 99/421 H, 99/449, 99/427
[51] Int. Cl. ........................................... A47j 37/04
[58] Field of Search... 99/421 H, 420, 419, 421 HH, 99/421 R, 421 HV, 421 P, 409–410, 411–412, 413–414, 426–427, 440, 449

[56] References Cited
UNITED STATES PATENTS

| 211,859 | 2/1879 | Manley | 99/440 X |
| 471,116 | 3/1892 | Hays et al. | 99/449 UX |
| 504,256 | 8/1893 | Strong | 99/427 X |
| 918,674 | 4/1909 | Hathaway | 99/449 X |
| 1,312,075 | 8/1919 | Grover | 99/449 X |
| 2,731,908 | 1/1956 | Morena | 99/414 |
| 3,335,712 | 8/1967 | Marasco | 99/421 H X |

Primary Examiner—Billy J. Wilhite
Assistant Examiner—Arthur O. Henderson
Attorney, Agent, or Firm—McCormick, Paulding & Huber

[57] ABSTRACT

A two-piece rotary spit for use with an electric drive motor above an open charcoal bed or the like in barbecuing roasts, fowl and the like. Each part of the spit includes an elongated rod section and a cage half section. One rod section has a square end portion for engagement by a drive motor and the other rod section is provided with a handle and an adjustable bearing member. One cage section comprises six (6) equally circumaxially spaced axial members which have extensions inclined inwardly to a hub member on the rod to form a cone-shaped outer cage portion. The other cage half section is similar but includes an annular member having small axial openings for slidably receiving the axial members of the first cage half section. Thumb screws associated with the axial openings secure the cage half sections in assembled relationship and a roast or fowl therewithin is held in a symmetrical and substantially balanced position.

8 Claims, 3 Drawing Figures

PATENTED MAY 28 1974 3,812,776

CAGE-TYPE ROTARY SPIT

BACKGROUND OF THE INVENTION

Various types of rotary spits are available for barbecuing roasts, fowl, etc. but such spits have not been entirely satisfactory. Piercing of the roast or fowl is generally required and while searing and basting may serve to retain flavorful juices within the roast or fowl during barbecuing, a large portion of such juices may escape on removal of the spit after barbecuing. Further, it is almost an impossibility to pierce a roast or fowl precisely at its center of gravity so as to provide for a symmetrical and balanced condition of the same during rotation on the spit. The small electric motors conventionally employed with such spits are incapable of providing a uniform speed of rotation with an unbalanced load and, in consequence, non-uniform rotational speed and accompanying objectionable noise is often encountered. More specifically, there is a tendency for the drive motor to labor noisily in turning the heavy portion of a roast to an upright position and a substantial change in noise level then occurs as the weight of the roast tends to cause the second half of a rotation to occur of its own accord. The resulting cyclical noise pattern can be quite objectionable.

SUMMARY OF THE INVENTION

It is the general object of the present invention to provide a cage-type rotary spit wherein ease and convenience of operation is provided for, piercing of roasts or fowl is wholly avoided, and substantial improvement in symmetrical orientation and balancing of the roast or fowl is achieved.

DESCRIPTION OF THE PREFERRED EMBODIMENT

Figure 1:
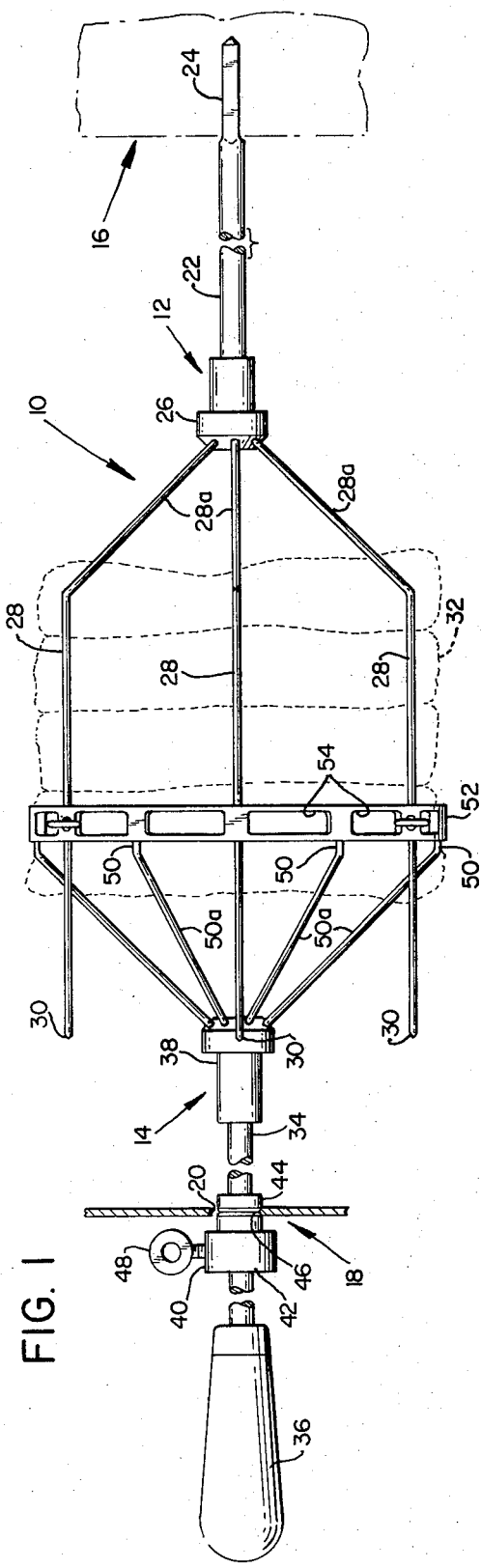
FIG. 1 is a side elevation of a rotary spit embodying the present invention.

Referring particularly to FIG. 1, it will be observed that a rotary spit of the cage type is indicated generally at 10. The spit is of two-piece construction and has a first or right-hand part indicated generally at 12 and a second or left-hand part indicated generally at 14. The right-hand part 12 has an associated drive motor 16 which may be of the conventional type ordinarily used in barbecuing roasts, fowl, etc. The left-hand part 14 has an associated bearing seat or journal member 18 which may take the form of a side wall of a barbecue grill having an opening 20 adapted to receive and rotatably support a rotary spit at a location spaced axially from the drive motor 16.

Figure 3:
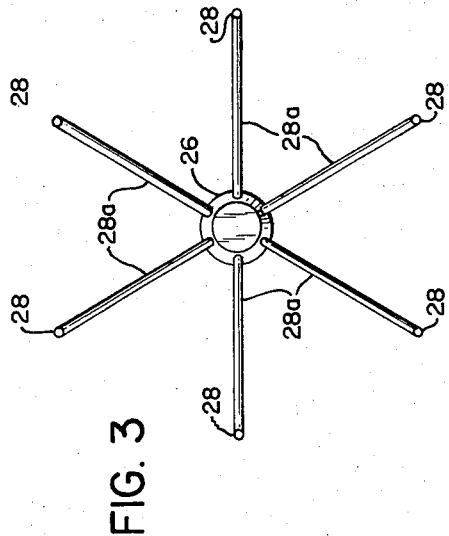
FIG. 3 is an end elevation of a right-hand part of the spit.

The right-hand part 12 of the spit comprises an elongated rod secton 22 which may vary in length as required and which preferably has a non-circular end portion at 24 for insertion in a complementary opening in an electric drive motor 16. As shown, the end portion 24 has a square cross section for engagement with the motor 16. A hub or hub-like member 26 is provided at the left-hand or inner end portion of the rod section 22 for supporting members defining a cage-like structure or a cage half section. More particularly, a right-hand cage half section comprises a plurality of slender axially extending members 28, 28 which are similar in length and construction and which have left-hand free end portions at 30, 30. The members 28 may vary in construction but preferably six (6) such members are provided as shown and the members are arranged in a circular configuration and in coaxial relationship with the rod section 22 for maintenance of roasts, fowl, etc. in a substantially symmetrical and balanced condition about the axis of the spit 10. That is, a roast such as indicated at 32 is engaged by the members 28, 28 externally but is in no way pierced by the members and is instead cradled or surrounded and thus constrained thereby. Preferably, and as shown, each member 28 has an extension 28a which extends angularly inwardly from an outer or right-hand end portion thereof and which has a terminal portion entered and secured in a suitable opening in the hub or hub member 26. The extensions 28a, 28a collectively form a cone-shaped outer or right-hand portion of the cage half section and tend further to urge a roast such as 32 into a symmetrical and balanced position. As will be apparent, right-hand portions of the roast are angularly engaged externally by the outer end portions of the extensions 28a, 28a and are urged to a central or symmetrical position thereby. Further, and as best illustrated in FIG. 3, the right-hand cage half section has an unobstructed opening facing leftwardly or in a direction opposite the rod section 22. Thus, it will be apparent that a roast such as 32 can be deposited within the axial members 28, 28 prior to assembly of the cage half sections.

The left-hand or second part of the spit comprises an elongated rod section 34 which has a handle 36 at an outer end portion and a hub or hub member 38 at an inner or right-hand end portion. Further, the rod is adapted to be rotatably supported adjacent an end portion thereof and, preferably, a small slidable bearing member 40 is provided. The member 40 may comprise a cylindrical collar or sleeve having a diametrically enlarged portion 42 and a diametrically smaller portion 44. The member 44 is preferably provided with an annular groove 46 for receiving an edge of the wall 18 adjacent the aforementioned opening 20 and for thus supporting and axially securing the spit whereby to prevent leftward axial movement of the same and disengagement of the end portion 24 from the motor 16. A thumb operable binder screw 48 secures the bearing member 40 in adjusted axial positions along the rod section 34.

Short slender axial members 50, 50 like the members 28, 28 have associated extensions 50a, 50a which extend angularly inwardly for connection with the hub 30. Thus, a cone-shaped left-hand or outer end portion of the cage half section 14 is provided for centering a roast such as 32, as in the case of the extensions 28a, 28a. Six axial members 50, 50 are preferably provided as shown and said members are arranged in a circular and coaxial configuration as in the case of the members 28, 28. Quite obviously, the relative lengths of the axial members 28, 28 and the axial members 50, 50 may vary widely within the scope of the invention. For example, the members 50, 50 may be substantially longer than shown with the members 28, 28 being substantially shorter.

Figure 2:
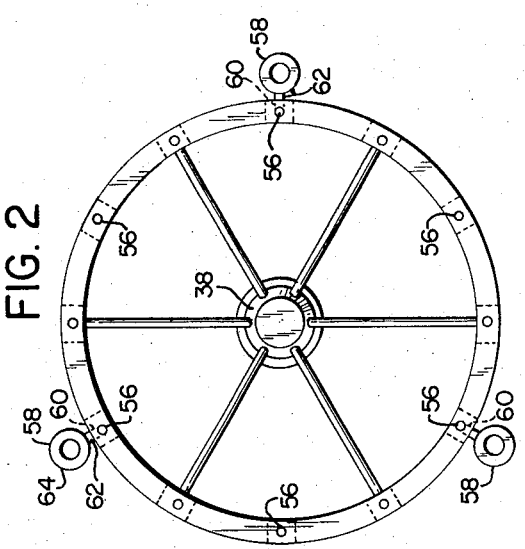
FIG. 2 is an end elevation of a left-hand part of the spit of the present invention.

There is also provided a means for releasably interconnecting the cage half sections with their respective open ends facing each other, the half section 14 defining an inwardly facing unobstructed opening as best illustrated in FIG. 2. While the connecting means may vary widely within the scope of the invention, it is presently preferred that an annular member or ring 52 be provided at a right-hand or inner end portion of the axial members 50, 50. The ring 52 may vary widely in form but as shown, has a substantial width or axial dimension for stability of the connection between cage half sections and several openings 54, 55 are provided therein for a light-weight construction. As best illustrated in FIG. 2, the annular member 52 is provided with a plurality of openings 56, 56 which are equally circumaxially spaced corresponding to the circumaxial spacing of the axial members 28, 28. Further, the openings 56, 56 extend in an axial direction and are slightly larger in diameter than the axial members 28, 28 so as to slidably receive the latter for adjustable assembly of the cage half sections.

More particularly, the axial members 28, 28 may be entered in the openings 56, 56 after a roast such as 32 has been deposited in one of the cage half sections and the half sections may thereupon be moved toward each other whereby to engage radial outwardly spaced end portions of the roast with the extensions 28a and 50a. On engagement of said extensions with the roast, the roast is urged toward a central or symmetrical position about the axis of the spit for balancing the same.

As shown, binder screws are provided at 58, 58 for engagement with the axial members 28, 28 but alternative connecting means may of course be provided within the scope of the invention. Small openings 60, 60 in the annular member 52 are threaded to receive complementary threaded shanks 62, 62 on the binder screws 58, 58. Enlarged thumb engageable outer portions 64, 64 on the screws facilitate manual manipulation of the same for securing the cage half sections in assembled position. Three screws 58, 58 are provided but the number may of course vary. Adjustable connection in an axial direction is of course achieved readily with the constructions shown.

From the foregoing, it will be apparent that the rotary spit of the present invention provides for a high degree of ease and convenience in operation. The roast or fowl to be barbecued may be readily deposited in one of the cage half sections without attention to central piercing or to piercing in any manner. The half sections may then be urged together with the axial members 28, 28 entered in the openings 56, 56 and the roast or fowl will be automatically substantially centered or oriented in a symmetrical and balanced condition. On tightening of the binder screws 58, 58, assembly of the case and spit is complete and the spit may be placed in position with its end portion 24 engaged with the motor 16 and its bearing member 40 mounted for rotation within the wall opening 20. On completion of barbecuing, mere loosening of the screws 58, 58 allow the cage half sections to be separated and the roast may then be placed upon a platter without loss of the flavor juices as occurs on withdrawal of a piercing type spit.

I claim:

1. A two-piece rotary spit for use with an electric drive motor above an open charcoal bed or the like in barbecuing roasts, fowl and the like, said spit comprising a first part having a first elongated rod section with a non-circular end portion adapted to be engaged and driven by an electric motor, said first part also comprising a first cage half section connected with said rod section and having an unobstructed opening facing in a direction opposite said rod section and a second part having a second elongated rod section adapted to be rotatably supported adjacent an end portion and having an associated second cage half section, said second cage half section also having an unobstructed opening facing in a direction opposite said second rod section, and said two cage-like half sections including means for releasable interconnection of the same with said openings in facing relationship whereby substantially to surround and constrain a roast, fowl or the ike for barbecuing the same, at least one of said cage half sections having a somewhat conical configuration opposite its said opening for urging roast, fowl and the like toward a symmetrical and substantially balanced condition, and said releasable interconnecting means including provision for relative axial sliding movement of said cage half sections to produce a cage of axially adjustable length and an axial clamping effect of roast, fowl and the like.

2. A two-piece rotary spit as set forth in claim 1 wherein each of said cage half sections exhibits a generally circular cross section viewed axially for constraining a roast, fowl or the like in a symmetrical and substantially balanced condition about the spit axis.

3. A two-piece rotary spit as set forth in claim 1 wherein each of said half sections comprises a plurality of slender elongated circumaxially spaced and axially extending members, and wherein one of said half sections has an annular member interconnecting its axial members adjacent its said opening, said annular member being slidably engageable with the axial members of said other half section and forming therewith a part of the aforesaid interconnecting means.

4. A two-piece rotary spit as set forth in claim 3 wherein each of said cage half sections has its said axial members integrally connected at axially outwardly disposed end portions with inwardly inclined extensions whereby to form outer cone-shaped cage portions which are disposed in facing relationship in the assembled cage.

5. A two-piece rotary spit as set forth in claim 4 wherein said annular member has a plurality of small axial openings respectively slidably receiving said axial members of said other cage half section, and wherein at least two of said openings have a small associated radial opening threaded internally and a cooperating threaded binder screw to adjustably secure the cage half sections in connected relationship.

6. A two-piece rotary spit as set forth in claim 5 wherein a small slidable and axially adjustable bearing member is provided on said rod section of said second spit part.

7. A two-piece rotary spit as set forth in claim 6 wherein a handle is provided at an outer end portion of said second rod section.

8. A two-piece rotary spit as set forth in claim 5 wherein six equally circumaxially spaced axial members are provided in each of said cage half sections.

* * * * *